United States Patent
Krogue et al.

(10) Patent No.: US 7,727,306 B2
(45) Date of Patent: Jun. 1, 2010

(54) SYSTEMS AND METHODS FOR FLOW-THROUGH TREATMENT OF CONTAMINATED FLUIDS

(75) Inventors: John A. Krogue, Mineral Wells, TX (US); Timothy L. Holmes, Kingwood, TX (US); Michelle Hewitt, Weatherford, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 542 days.

(21) Appl. No.: 11/731,149

(22) Filed: Mar. 30, 2007

(65) Prior Publication Data

US 2007/0295204 A1 Dec. 27, 2007

Related U.S. Application Data

(60) Provisional application No. 60/787,951, filed on Mar. 31, 2006.

(51) Int. Cl.
 *B01D 53/02* (2006.01)
(52) U.S. Cl. ............................ 95/24; 95/107; 95/133; 95/134; 95/148; 96/116; 96/121; 96/143; 96/150; 96/154
(58) Field of Classification Search .............. 95/24, 95/107, 133, 134, 148; 96/108, 116, 121, 96/143, 150, 154; 210/205, 269, 744, 791, 210/660
See application file for complete search history.

(56) References Cited

U.S. PATENT DOCUMENTS

| | | | |
|---|---|---|---|
| 2,703,441 A | 3/1955 | Langdon et al. | 19/156 |
| 2,774,294 A | 12/1956 | Kahle | 98/76 |
| 2,890,497 A | 6/1959 | Langdon et al. | 19/156 |
| 3,744,092 A | 7/1973 | Auten | 19/156.3 |
| 4,586,760 A | 5/1986 | Welker | 312/245 |
| 5,189,092 A | 2/1993 | Koslow | 524/495 |
| 5,893,956 A | 4/1999 | Perry, Jr. et al. | 156/167 |
| 6,326,326 B1 | 12/2001 | Feng et al. | 502/62 |
| 6,436,294 B2 | 8/2002 | Lundquist | 210/674 |
| 2007/0256980 A1 | 11/2007 | Krogue et al. | 210/688 |
| 2007/0262025 A1 | 11/2007 | Krogue et al. | 210/679 |

OTHER PUBLICATIONS

Lin et al, "Selective Sorption of Cesium Using Self-Assembled Monolayers on Mesoporous Supports", Environmental Science & Technology, vol. 35, No. 19, 2001, pp. 3962-3966.*
PCT International Search Report based onPCT/US07/08236 dated May 16, 2008.

* cited by examiner

*Primary Examiner*—Robert A Hopkins
(74) *Attorney, Agent, or Firm*—Chinh H. Pham; Greenberg Traurig, LLP

(57) ABSTRACT

A system for use in the treatment of contaminated fluid is provided. The system includes a source from which contaminated fluid may be introduced into the system, and a reservoir for an adsorbent material designed to remove contaminants from the fluid. The system also includes a reactor within which the adsorbent material and the contaminated fluid may be accommodated for treatment. A separation device may further be included for removing spent adsorbent materials from the system. A method for treating contaminated fluid is also provided.

47 Claims, 1 Drawing Sheet

SYSTEMS AND METHODS FOR FLOW-THROUGH TREATMENT OF CONTAMINATED FLUIDS

RELATED U.S. APPLICATION(S)

The present application claims priority to U.S. Provisional Application Ser. No. 60/787,951, filed Mar. 31, 2006, which application is hereby incorporated herein by reference.

TECHNICAL FIELD

The present invention relates to systems and methods for treatment of contaminated fluids, and more particularly, to the removal of heavy metals from fluids through the use of self-assembled monolayers on mesoporous supports (SAMMS) in a flow-through protocol.

BACKGROUND ART

Produced fluid, such as water, from offshore oil platforms can contain toxic heavy metals, for instance, mercury. In the Gulf of Mexico, mercury levels rarely exceed 100 parts per billion (ppb). However, in the Gulf of Thailand, the average concentration of mercury in produced water can range from about 200 ppb to about 2,000 ppb.

Discharge of mercury into the marine environment in U.S. territorial waters is currently regulated by the U.S. Environmental Protection Agency (EPA) under the Clean Water Act via the National Pollutant Discharge Elimination System permit process. According to environmental standards under 40 CFR §131.36 for marine environment, limits include about 1800 ppb for acute exposure and about 25 ppb for chronic exposure. International standards for mercury discharges in produced water, on the other hand, range from about 5 ppb in Thailand to about 300 ppb in the North Sea.

Produced water often contains oil that was removed with the water during the bulk oil/water separation process. As an example, the produced water from the North Sea fields contains about 15-30 parts per million (ppm) dispersed oil with benzene, toluene, ethylbenzene, and xylene (BTEX); naphthalene, phenanthrene, dibenzothiophene (NPD), polycyclic aromatic hydrocarbon (PAH), phenol, and organic acid concentrations ranging from about 0.06 ppm to about 760 ppm. Additionally, these produced waters contain toxic heavy metals, such as mercury, cadmium, lead, and copper in concentrations ranging from less than about 0.1 ppb to about 82 ppb. The presence of a complex mix of constituents coupled with a high concentration of dissolved salts can present a challenge for heavy metal removal using currently available conventional technologies.

In particular, existing technologies for metal and mercury removal from diluted wastewater include activated carbon adsorption, sulfur-impregnated activated carbon, microemulsion liquid membranes, ion exchange, and colloid precipitate flotation. These technologies may not be suitable for water treatment because of poor metal loading (e.g., metal uptake less than 20% of the mass of the adsorber material) and selectivity, (interference from other abundant ions in groundwater). In addition, mercury may be present in species other than elemental. So the method must be able to remove these other species, such as methyl mercury etc. Furthermore, they lack stability for metal-laden products so that they are not disposable directly as a permanent waste form. As a result, secondary treatment is required to dispose or stabilize the separated mercury or the mercury-laden products. Mercury removal from non-aqueous sludge, adsorbed liquids, or partially- or fully-stabilized sludges, and mercury-contaminated soil is difficult because (1) the non-aqueous nature of some wastes prevents the easy access of leaching agents, (2) some waste streams with large volumes make the thermal desorption process expensive, and (3) the treatment of some waste streams are technically difficult because of the nature of the wastes.

Mercury removal from offgas in vitrifiers and in mercury thermal desorption processes is usually accomplished through active carbon adsorption. However, the carbon-based adsorbents are only effective enough to remove 75 to 99.9% of the mercury with a loading capacity equivalent to 1-20% of the mass of the adsorber material. A last step, mercury amalgamation using expensive gold, usually is needed to achieve the EPA air release standard. A carbon bed usually is used later in the offgas system, where the temperature is generally lower than 250° F. In the sulfur impregnated carbon process, mercury is adsorbed to the carbon, which is much weaker than the covalent bond formed with, for instance, surface functionalized mesoporous material. As a result, the adsorbed mercury needs secondary stabilization because the mercury-laden carbon does not have the desired long-term chemical durability due to the weak bonding between the mercury and active carbon. In addition, a large portion of the pores in the activated carbon are large enough for the entry of microbes to solubilize the adsorbed mercury-sulfur compounds. The mercury loading is limited to about 0.2 g/g of the materials.

The microemulsion liquid membrane technique uses an oleic acid microemulsion liquid membrane containing sulfuric acid as the internal phase to reduce the wastewater mercury concentration from about 460 ppm to about 0.84 ppm. However, it involves multiple steps of extraction, stripping, demulsification, and recovery of mercury by electrolysis and uses large volumes of organic solvents. The liquid membrane swelling has a negative impact on extraction efficiency.

The slow kinetics of the metal-ion exchanger reaction requires long contacting times. This process also generates large volumes of organic secondary wastes. One ion exchange process utilizes Duolite™ GT-73 ion exchange organic resin to reduce the mercury level in wastewater from about 2 ppm to below about 10 ppb. Oxidation of the resin results in substantially reduced resin life and an inability to reduce the mercury level to below the permitted level of less than about 0.1 ppb. The mercury loading is also limited because the high binding capacity of most soils to mercury cations makes the ion-exchange process ineffective, especially when the large amounts of $Ca^{2+}$ from soil saturate the cation capacity of the ion exchanger. In addition, the mercury-laden organic resin does not have the ability to resist microbe attack. Thus, mercury can be released into the environment if it is disposed of as a waste form. In addition to interference from other cations in the solution besides the mercury-containing ions, the ion exchange process is simply not effective in removing neutral mercury compounds, such as $HgCl_2$, $Hg(OH)_2$, and organic mercury species, such as methylmercury, which is the most toxic form of mercury. This ion-exchange process is also not effective in removing mercury from non-aqueous solutions and adsorbing liquids.

The reported removal of metal from water by colloid precipitate flotation reduces mercury concentration from about 160 ppb to about 1.6 ppb. This process involves the addition of HCl to adjust the wastewater to pH 1, addition of $Na_2S$ and oleic acid solutions to the wastewater, and removal of colloids from the wastewater. In this process, the treated wastewater is potentially contaminated with the $Na_2S$, oleic acid, and HCl. The separated mercury needs further treatment to be stabilized as a permanent waste form.

Acidic halide solution leaching and oxidative extractions can also be used in mobilizing mercury in soils. For example $KI/I_2$ solutions enhance dissolution of mercury by oxidization and complexation. Other oxidative extractants based on hypochlorite solutions have also been used in mobilizing mercury from solid wastes. Nevertheless, no effective treatment technology has been developed for removing the mercury contained in these wastes. Since leaching technologies rely upon a solubilization process wherein the solubilized target (e.g. mercury) reaches a dissolution/precipitation equilibrium between the solution and solid wastes, further dissolution of the contaminants from the solid wastes is prevented once equilibrium is reached. In addition, soils are usually a good target ion absorber that inhibits the transfer of the target ion from soils to solution.

The removal of mercury from nonaqueous liquids, adsorbed liquids, soils, or partially-or-fully-stabilized sludge at prototypic process rates has been lacking. This is mainly because the mercury contaminants in actual wastes are much more complicated than the mercury systems addressed by many laboratory-scale tests that are usually developed based on some simple mercury salts. The actual mercury contaminants in any actual wastes almost always contain inorganic mercury (e.g., divalent cation $Hg^{2+}$, monovalent $Hg_2^{2+}$, and neutral compounds such as $HgCl_2$, $Hg[OH]_2$,); organic mercury, such as methylmercury (e.g., $CH_3 HgCH_3$ or $CH_3 Hg^+$) as a result of enzymatic reaction in the sludge; and metallic mercury, because of reduction. Since many laboratory technologies are developed for only one form of mercury, demonstrations using actual wastes have not been successful.

Other metals that are of interest for remediation and industrial separations include but are not limited to silver, lead, uranium, plutonium, neptunium, americium, cadmium and combinations thereof. Present methods of separation include but are not limited to ion exchangers, precipitation, membrane separations, and combinations thereof. These methods usually have the disadvantages of low efficiencies, complex procedures, and high operation costs.

Accordingly, it would be advantageous to provide a system and method that can be used to remove heavy metals, such as mercury, cadmium, and lead from complex waste fluids, such as produced water, in a significant amount and in a cost effective manner.

SUMMARY OF THE INVENTION

The present invention, in one embodiment, provides to a system for treatment of contaminated fluid. The system, in an embodiment, includes a source from which contaminated fluid may be introduced into the system, and a reservoir for an adsorbent nanomaterial designed to remove contaminants from the fluid. In an embodiment, the adsorbent nanomaterial may include a porous particle made from self-assembled monolayers on mesoporous supports (SAMMS). The adsorbent nanomaterial may be used to remove heavy metals, such as mercury, arsenic, cadmium, lead, silver, uranium, plutonium, neptunium, americium, other heavy metals, or a combination thereof. The system also includes a container within which the adsorbent nanomaterial and the contaminated fluid may be accommodated for treatment of the fluid. The system further includes an outlet on the reactor through which treated fluid can exit from the reactor, and a separation device for removing the spent adsorbent nanomaterial from the system.

The present invention, in another embodiment, provides a method for treatment of contaminated fluid. The method includes initially providing an environment within which contaminated fluid can be treated. Next, contaminated fluid along with an amount of an adsorbent nanomaterial may be introduced into the environment. Thereafter, the adsorbent nanomaterial may be permitted to interact with the contaminated fluid over a period of time, so that the adsorbent nanomaterial can attract and remove contaminants from the fluid. Once the contaminants have been removed and the fluid has been treated, the treated fluid may be discharged from the environment. To the extent desired, the adsorbent nanomaterial may be removed and regenerated for subsequent use.

DESCRIPTION OF SPECIFIC EMBODIMENTS

Figure 1:
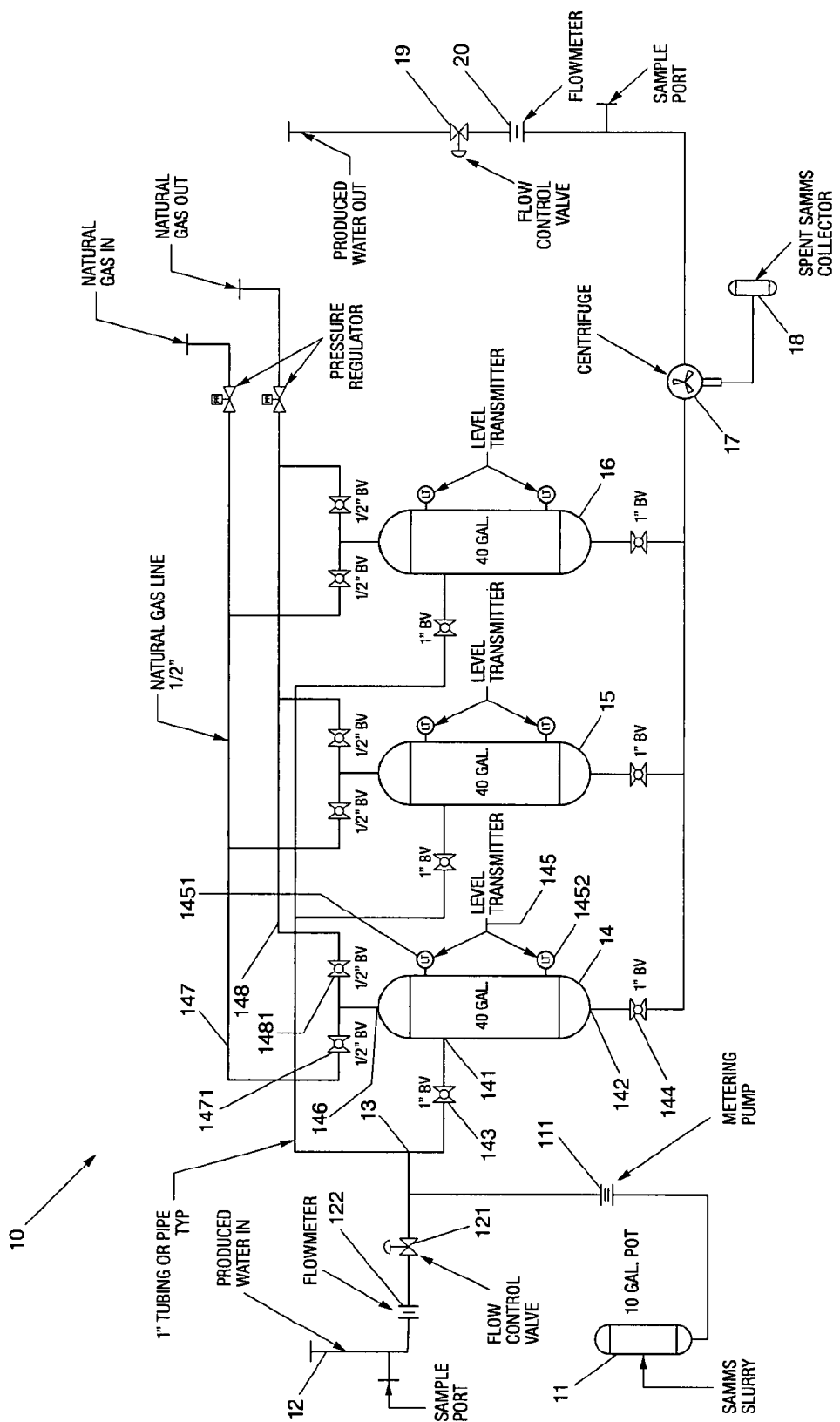
FIG. 1 illustrates a system for use in the treatment of contaminated fluids

With reference to FIG. 1, the present invention provides, in one embodiment, a system 10 for treating contaminated fluid by removing contaminants that exist within the fluid. Fluids which may be treated in connection with the present invention may be viscous in nature, such as oil, or non-viscous in nature, such as a liquid or a gas. Contaminants that may be removed by system 10 of the present invention include heavy metals, such as mercury, arsenic, cadmium, and lead from complex waste fluids, such as produced water, and mercury from a variety of waste solutions and contaminated waste oils. Other contaminants that may be removed by system 10 of the present invention includes silver, uranium, plutonium, neptunium, americium, or a combination thereof.

The system 10, as illustrated in FIG. 1, includes, in an embodiment, a reservoir 11 within which a waste adsorbent material, capable of removing contaminants from a fluid, may be stored. The adsorbent material, in one embodiment, may be a nanosorbent material (i.e., adsorbent nanomaterial) manufactured from self-assembled monolayers on mesoporous supports (SAMMS). It should be appreciated that reference to the term "adsorbent material" hereinafter includes nanosorbent material or adsorbent nanomaterial, either of which may be used interchangeably with the other. The mesoporous support, in an embodiment, may be made from various porous materials, including silica. An example of a SAMMS material that can be used in connection with the system 10 of the present invention includes thiol-SAMMS, such as that disclosed in U.S. Pat. No. 6,326,326, which patent is hereby incorporated herein by reference.

In accordance with one embodiment of the present invention, the adsorbent material may include porous particles, ranging from about 5 microns to about 200 microns in size. In one embodiment, the particles, on average, range from about 50 microns to about 80 microns in size, include a pore size ranging from about 2 nanometers (nm) to about 7 nm, and may be provided with an apparent density ranging from about 0.2 grams/milliliter to about 0.4 grams/milliliter. To permit ease of introduction into the system 10 and ease of flow therealong, the adsorbent material may be provided as a slurry mixture. In particular, the waste adsorbent material may be mixed with a liquid, such as water, to provide the necessary slurry mixture. This slurry mixture may, in an embodiment, be maintained in a mixed form within reservoir 11 by methods known in the art, for example, by any mechanical devices or fluid injection mechanisms capable of creating a necessary turbulence. Alternatively, it should be appreciated that as the slurry mixture is introduced into the system 10, the natural turbulence of the stream of slurry mixture may be sufficient to generate the appropriate mixing. Should it be necessary or to further enhance mixture of the slurry, a mixer (not shown), such as a static mixer commercially available through many outlets in the industry, may be provided immediately downstream of the reservoir 11. The presence of this static mixer can further optimize the mixing of the slurry as it flow along the system 10.

To control the introduction of waste adsorbent material into system 10, a metering pump 111 may be provided to permit either manual or automatic control of an amount of the waste adsorbent material that can be introduced into the system 10. The amount of waste adsorbent material introduced can be critical, as will be noted below, since an appropriate amount must be determined in order to provide an optimum waste removal capacity.

Still looking at FIG. 1, the system 10 may also include a source 12 from which contaminated fluid may be introduced into the system 10. In accordance with one embodiment, the contaminated fluid may be waste fluid, such as produced water generated in connection with oil or gas drilling. The contaminated fluid, in an embodiment, may be introduced into system 10 at a controlled rate, so that an appropriate amount of the waste adsorbent material can be determined for introduction into the system 10. In particular, the amount of adsorbent material that may be needed can be proportional to the flow rate of the contaminated fluid and the amount of contaminant within the fluid flow. Generally, the amount of contaminant will be constant, so that the flow rate of the fluid may be a parameter which needs to be controlled.

To control the flow rate of the fluid, a flow control valve 121 may be provided downstream of source 12. In addition, a flow-meter 122 may be provided between the source 12 and the control valve 121 to help in determining the flow rate before control valve 121 is adjusted to an appropriate level. It should be noted that although system 10 is shown having a control valve 121, such a valve may not be necessary should the flow rate be capable of being adjusted from the source 11 based on the reading on the flow-meter 122.

The system 10 may also include a pathway 13 along which the adsorbent material and the contaminated fluid may mix ("fluid/adsorbent mixture") and travel to a reactor 14. Of course, should it be desired, system 10 may be designed to permit the adsorbent material and the contaminated fluid to be introduced independently into reactor 14 without first mixing with one another. Moreover, should the adsorbent material be added directly into the reactor 14, a slurry of the waste adsorbent material may not be necessary. Rather, the adsorbent material may be added dry into the reactor 14.

In one embodiment, reactor 14 provides an environment within which the fluid/adsorbent mixture may be accommodated over a period of time. During this time period, contaminants from the fluid may be adsorbed by the waste adsorbent material and removed from the fluid until an acceptable concentration of contaminants within the fluid has been reached. The period of time, in an embodiment, can be determined by the kinetics of the adsorption of the contaminants into the waste adsorbent material, as well as by the diffusion time of the contaminants within the fluid flow into the waste adsorbent material, and may last from about less than two minutes to about ten minutes. It should be noted that introduction of the fluid/adsorbent mixture into the reactor 14 can provide sufficient turbulence in order to achieve the necessary mixing action between the contaminated fluid and the waste adsorbent material. To the extent needed, a mixing mechanism may be provided within the reactor 14.

In accordance with an embodiment of the present invention, reactor 14 may be provided with an inlet 141 and an outlet 142. As shown in FIG. 1, inlet 141 may be controlled by inlet valve 143 and outlet 142 may be controlled by outlet valve 144. Valves 143 and 144, in an embodiment, may be automatically actuated or electronically controlled by means known in the art. Alternatively, these valves may be designed to be manually actuated. Reactor 14 may also include a level transmitter or sensor 145 to indicate when the reactor 14 is full and when it is empty. In the embodiment shown in FIG. 1, the sensor 145 includes a top sensor 1451 to determine and indicate when reactor 14 is substantially full, and a bottom sensor 1452 to determine and indicate when reactor 14 is substantially empty. Reactor 14 may also include a pump (not shown) to assist in the removal or draining of treated fluid from the reactor 14.

In an alternate embodiment, rather than a pump, reactor 14 may include an second inlet 146 coupled to, for instance, two natural gas lines 147 and 148 to assist in the removal of the treated fluid from the reactor 14. In particular, line 147 may be a "gas-in" line that may be regulated by a gas-in valve 1471 to a relatively slightly higher pressure than that of an operating pressure of the contaminated fluid. In this manner, the higher pressure can act to subsequently push the treated fluid from the reactor 14. Line 148, on the other hand, may be a "gas-out" line that may be regulated by gas-out valve 1481 to maintain a substantially similar pressure to that of the contaminated fluid pressure. Operation of these gas lines in connection with the emptying of treated fluid from the reactor 14 will be discussed hereinafter in detailed. Moreover, although described in connection with natural gas, it should be appreciated other gases may be used.

Still looking at FIG. 1, rather than having one reactor 14, the system 10 may be provided with at least two or more substantially similar reactors, such as reactors 15 and 16, illustrated in FIG. 1, to allow a continuous treatment process to be implemented. In other words, with at least two reactors, one reactor, for example, reactor 14, may be drained of the treated fluid that is substantially free of contaminants, while the other reactor, for example, reactor 15, may be filled with the fluid/adsorbent mixture. This cycle can be repeated continuously as one reactor empties while the other reactor fills.

The system 10 may further be provided with a separation device 17 for the removal of spent adsorbent material. In one embodiment, the separation device 17 may be a centrifuge-type separation device. Such a device 17, in an embodiment, uses centrifugal force to concentrate spent adsorbent material at the bottom of the device 17. A collector 18 may also be provided, so that the spent adsorbent material concentrated at the bottom of the device 17 may be directed thereinto and removed from system 10. Alternatively, the separation device 17 may be a filter designed with pores or mesh openings capable of preventing particles, such as the adsorbent material, ranging from about 5 microns to about 200 microns in size, from moving thereacross. The separation device 17, in an embodiment, may be located downstream from reactor 14, as illustrated in FIG. 1, or down stream from all the reactors when multiple reactors are used. Alternatively, separation device 17 may be located, for example, about the outlet 142 to remove the spent adsorbent nanomaterial as it exits the reactor 14 through outlet 142.

System 10 may also include a discharge valve 19 and flow-meter 20 for use in connection with the discharge of cleaned or treated fluid from system 10. The flow-meter 20, in an embodiment, can help to determine the flow rate of the cleaned or treated fluid while the discharge valve 19 can be used to control the discharge rate relative to the flow rate.

In operation, reactor 14 may start out being empty of the fluid/adsorbent mixture. In this empty state, in accordance with one embodiment, inlet valve 143 and outlet valve 144 of reactor 14 may be in the closed position. To the extent that system 10 includes multiple reactors, reactors 15 and 16 may similarly be empty with their respective inlet and outlet valves similarly in the closed position. Although empty of the fluid/adsorbent mixture, reactor 14, in one embodiment, may be full of, for instance, natural gas that may be at the operating pressure of the contaminated fluid. In this initial stage, the gas-in valve 1471 of reactor 14 may be closed, while the gas-out valve 1481 may be open.

Thereafter, inlet valve 143 of reactor 14 may be opened, so that the fluid/adsorbent mixture (i.e., contaminated fluid containing the adsorbent material, such as SAMMS) may be introduced into reactor 14. It should be noted that in a multi-reactor system, the inlet valves of reactors 15 and 16 remain closed. As the fluid/adsorbent mixture fills reactor 14, the natural gas within reactor gets vented from reactor 14 through the gas-out valve 1481, which has been maintaining the gas within the reactor 14 at a back pressure substantially equal to the flowing pressure of the contaminant fluid. In addition, as the fluid/adsorbent mixtures begins to fill the reactor 14 and approaches the location of the top sensor 1451, the top sensor 1451 may transmit, when reactor 14 is full, a signal to a PLC. Upon receipt of the signal, the PLC can act to thereafter close the inlet valve 143 of reactor 14. It should be noted that during this filling process, the adsorbent material, as mentioned above, can act to remove the contaminants from the contaminated fluid to provide substantially clean fluid. In particular, in the presence of the adsorbent material, which in one embodiment, may be mesoporous SAMMS, fluid can be permitted to flow through the pores of the particles in the SAMMS material. Within these pores, particular contaminants, such as a heavy metal (e.g., mercury), come in contact with a monolayer of chemical designed to attract and bind the molecules of these contaminants, along with the other constituents of the fluid flow. As such these particular contaminants may be trapped within the SAMMS material and removed from the fluid flow Subsequently, the gas-out valve 1481 may be closed, the gas-in valve 1471 may be opened, and the outlet valve 144 may be opened. At this stage, higher pressure gas from gas-in line 147 may enter into reactor 14 and act to force the cleaned fluid along with the spent adsorbent material through outlet 142 and out of the reactor 14. This emptying process may continue until the cleaned liquid level reaches bottom sensor 1452, at which time the bottom sensor may transmit a signal to the PLC. Thereafter, the PLC may act to close the outlet valve 144. The gas-in valve 1471 may then be closed, and the gas-out valve 1481 may return to the open state. The reactor 14 may thereafter be ready to go through another filling cycle.

In a multi-reactor system, such as that illustrated in FIG. 1, when the top sensor 1451 transmit a signal to the PLC to notify that reactor 14 is full, as the inlet valve 143 of reactor 14 closes, the inlet valve to the adjacent reactor 15 opens to permit a continuous process to be carried out. Subsequently, as reactor 15 becomes full, its inlet valve may be closed and the inlet valve to adjacent reactor 16 may open to permit filling of reactor 16. Thereafter, as reactor 16 becomes full, its inlet valve may be closed and inlet valve 143 of reactor 14 may open to continue the process of the present invention. This continuous process, of course, may be carried out with only two reactors in the system should that be necessary.

In accordance with one embodiment of the present invention, prior to discharging the cleaned fluid, the used or spent adsorbent material may be removed. In one approach, clean fluid and spent adsorbent material may be permitted to flow across a filter (not shown) where the spent adsorbent material may be trapped. The filter, in an embodiment, may be provided with pores that are substantially smaller than the adsorbent material while still sufficiently large to permit the clean fluid to move therethrough. As the filter becomes full with the spent adsorbent material, the filter may be isolated and removed along with the adsorbent material. A new filter may be put in place for subsequent removal of the adsorbent material. To provide continuous operation, system 10 may be provided with at least two filters in parallel, so that the adsorbent material can continue to be filtered, while the full filter is being replaced.

In an alternate approach, the system 10, as shown in FIG. 1, may utilize the centrifuge-type separation device 17. This device 17, as noted above, uses centrifugal force to concentrate the spent adsorbent material at the bottom of the device 17. Once at the bottom of device 17, the adsorbent material may be removed and directed to a collector 18, while the cleaned treated fluid may be discharged. The spent adsorbent material may thereafter be disposed or regenerated for subsequent use.

To regenerate the adsorbent material for subsequent use, the adsorbent material may be treated with an acidic fluid to remove the adsorbed contaminant. After this regeneration process, the adsorbent material may be put back in service to again remove the contaminants.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A system for treatment of contaminated fluid, the system comprising:
   a reservoir of an adsorbent nanomaterial designed to remove contaminants from contaminated fluid;
   a reactor for providing an environment within which a mixture of adsorbent nanomaterial and contaminated fluid can be accommodated for treatment of the contaminated fluid;
   a pump designed to introduce, into the system, an amount of adsorbent nanomaterial that can be proportional to a flow rate of the contaminated fluid and an amount of contaminant in the contaminated fluid, so as to substantially reduce a period of time for treatment;
   an outlet on the reactor through which treated fluid within the reactor can exit; and
   a separation device for removal of spent adsorbent material.

2. A system as set forth in claim 1, wherein the adsorbent nanomaterial in the reservoir includes a porous particle made from self-assembled monolayers on mesoporous supports (SAMMS).

3. A system as set forth in claim 2, wherein the particle is made from silica.

4. A system as set forth in claim 2, wherein the particle has a pore size ranging from about 2 nanometers (nm) to about 7 nm.

5. A system as set forth in claim 1, wherein the adsorbent nanomaterial has an apparent density ranging from about 0.2 grams/milliliter to about 0.4 grams/milliliter.

6. A system as set forth in claim 1, wherein the adsorbent nanomaterial is capable of removing heavy metal contaminants from the fluid.

7. A system as set forth in claim 6, wherein the heavy metal contaminants include mercury, arsenic, cadmium, lead, silver, uranium, plutonium, neptunium, americium, other heavy metals, or a combination thereof.

8. A system as set forth in claim 1, wherein the contaminated fluid is viscous in nature.

9. A system as set forth in claim 8, wherein the viscous fluid includes one of oils, waste oils, other fluid viscous in nature, or a combination thereof.

10. A system as set forth in claim 1, wherein the contaminated fluid is non-viscous in nature.

11. A system as set forth in claim 10, wherein the non-viscous fluid includes a liquid or a gas.

12. A system as set forth in claim 10, wherein the non-viscous fluid includes produced water.

13. A system as set forth in claim 1, wherein the reactor includes an inlet to permit contaminated fluid and the adsorbent nanomaterial to be introduced into the reactor.

14. A system as set forth in claim 1, wherein the reactor includes a pump to assist in the removal of treated fluid from the reactor.

15. A system as set forth in claim 1, wherein the reactor includes a second inlet to introduce a volume of high pressure into the reactor to assist in the removal of treated fluid from the reactor.

16. A system as set forth in claim 1, wherein the separation device is a centrifugal force type device capable of concentrating spent adsorbent material at a bottom of the device.

17. A system as set forth in claim 16, wherein the separation device includes a collector at the bottom of the device, so that the spent adsorbent material concentrated at the bottom of the device can be directed thereinto and removed.

18. A system as set forth in claim 1, wherein the separation device is a filter having pores or mesh openings capable of collecting the adsorbent nanomaterials thereon for removal.

19. A system as set forth in claim 1, further including a pathway between the reservoir and the reactor to permit the mixture of adsorbent nanomaterial and contaminated fluid to travel to the reactor.

20. A system as set forth in claim 19, further including a control valve on the pathway to adjust a flow rate of the mixture along the pathway.

21. A system as set forth in claim 1, further including a mixer associated with the reactor to enhance mixing of the adsorbent nanomaterial and contaminated fluid.

22. A system as set forth in claim 1, further including a sensor for indicating a level of the mixture of adsorbent nanomaterial and contaminated fluid within the reactor.

23. A system as set forth in claim 1, further including a discharge valve to remove treated fluid from the system.

24. A system as set forth in claim 23, further including a flow meter associated with the discharge valve to determine a flow rate of treated fluid being removed from the system.

25. A system as set forth in claim 1, further having at least one additional reactors to permit a continuous treatment process to be implemented.

26. A system as set forth in claim 1, wherein the period of time for treatment is less than 15 minutes.

27. A system as set forth in claim 1, wherein the period of time for treatment ranges from less than about 2 minutes to about 10 minutes.

28. A method for treating contaminated fluid, the method comprising:
   providing an environment within which contaminated fluid can be treated;
   introducing an amount of an adsorbent nanomaterial and a contaminated fluid into the environment, the amount of adsorbent nanomaterial being introduced being proportional to the flow-rate of the contaminated fluid and an amount of contaminant within the contaminated fluid;
   allowing the adsorbent nanomaterial to interact with the contaminated fluid over a period of time, so that the adsorbent nanomaterial can attract and remove contaminants from the fluid; and
   discharging treated fluid from the environment.

29. A method as set forth in claim 28, wherein the step of providing includes providing a source of contaminated fluid to be treated and a reservoir of the adsorbent nanomaterial.

30. A method as set forth in claim 28, wherein the step of introducing includes generating a slurry of adsorbent nanomaterial.

31. A method as set forth in claim 28, wherein the step of introducing includes mixing the adsorbent nanomaterial and the contaminated fluid prior to directing them into the environment.

32. A method as set forth in claim 28, wherein the step of introducing includes directing the adsorbent nanomaterial and the contaminated fluid independently into the environment.

33. A method as set forth in claim 28, wherein, in the step of introducing, the adsorbent nanomaterial includes a porous particle made from self-assembled monolayers on mesoporous supports (SAMMS).

34. A method as set forth in claim 33, wherein the step of introducing includes providing a slurry of SAMMS having an apparent density ranging from about 0.2 grams/milliliter to about 0.4 grams/milliliter.

35. A method as set forth in claim 28, wherein the step of introducing includes controlling a rate at which the contaminated fluid may be introduced, so that an appropriate amount of the adsorbent nanomaterial can be determined for introduction.

36. A method as set forth in claim 35, wherein, in the step of controlling, the amount of adsorbent nanomaterial can be proportional to the flow rate of the contaminated fluid and the amount of contaminant within the fluid flow.

37. A method as set forth in claim 28, wherein, in the step of introducing, the contaminated fluid is viscous in nature.

38. A method as set forth in claim 37, wherein, in the step of introducing, the viscous fluid includes one of oils, waste oils, other fluid viscous in nature, or a combination thereof.

39. A method as set forth in claim 28, wherein, in the step of introducing, the contaminated fluid is non-viscous in nature.

40. A method as set forth in claim 39, wherein, in the step of introducing, the non-viscous fluid includes a liquid or a gas.

41. A method as set forth in claim 39, wherein, in the step of introducing, the non-viscous fluid includes produced water.

42. A method as set forth in claim 28, wherein, in the step of allowing, the period of time ranges from less than about 2 min. to about 10 min.

43. A method as set forth in claim 28, wherein the step of allowing includes permitting the adsorbent nanomaterial to remove heavy metal contaminants from the fluid.

44. A method as set forth in claim 43, wherein, in the step of permitting, the heavy metal contaminants include mercury, arsenic, cadmium, lead, silver, uranium, plutonium, neptunium, americium, other heavy metals, or a combination thereof.

45. A method as set forth in claim 28, wherein the step of allowing includes permitting the adsorbent nanomaterial to bind and trap the contaminants within the nanomaterial.

46. A method as set forth in claim 28, wherein the step of discharging includes collecting spent adsorbent nanomaterial having contaminants attracted thereto.

47. A method as set forth in claim 28, further including providing a plurality of similar environments within which contaminated fluid can be treated, so as to implement a substantially continuous treatment process.

* * * * *